Figure 4:
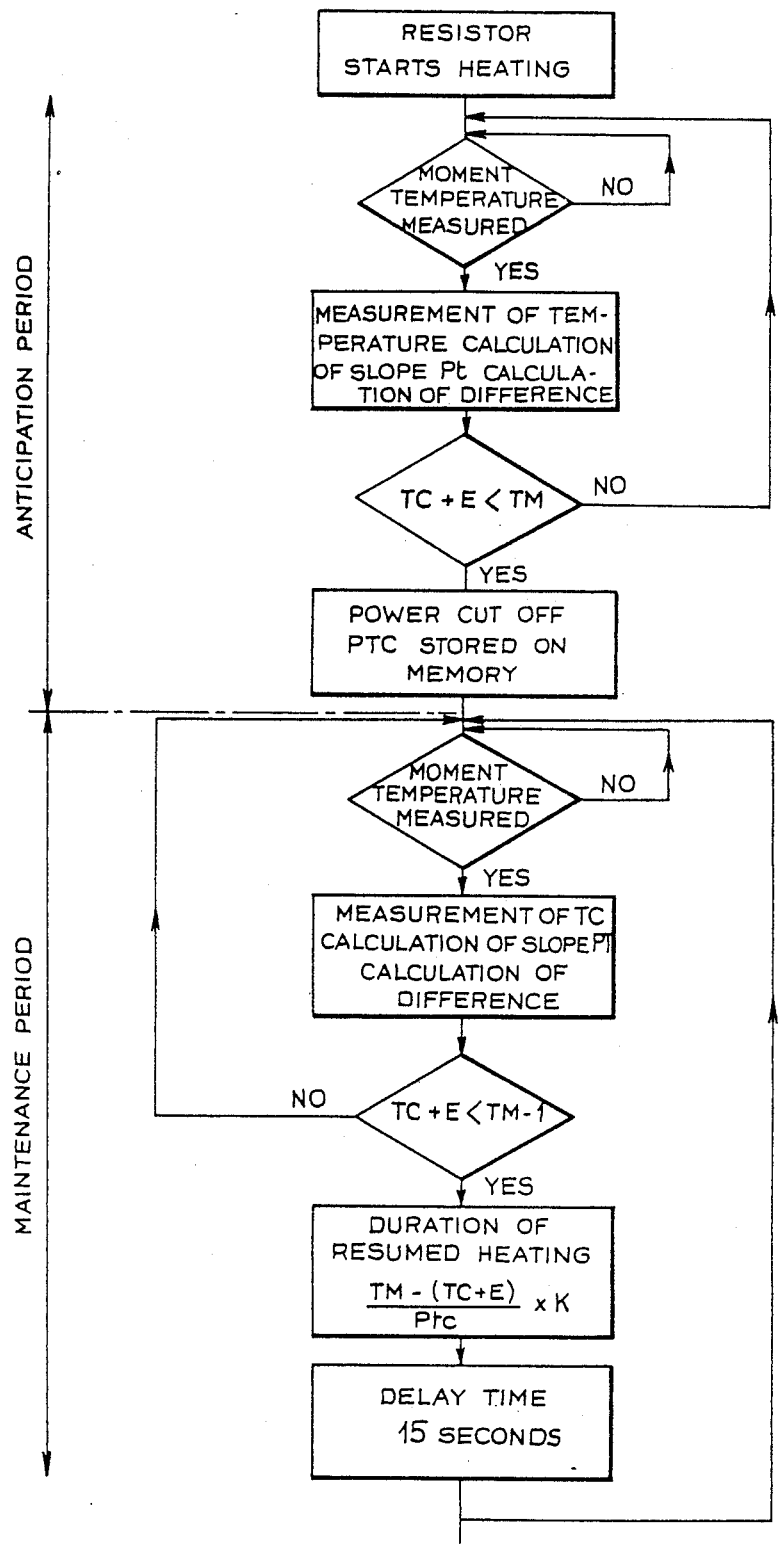

United States Patent [19]

Duborper et al.

[11] Patent Number: 4,962,299

[45] Date of Patent: Oct. 9, 1990

[54] METHOD AND APPARATUS FOR THE THERMAL CONTROL OF A HEATING DEVICE

[75] Inventors: Alain Duborper; Gilles Miquelot; Paul Rivier; Roger Rosset, all of Rumilly, France

[73] Assignee: SEB, S.A., France

[21] Appl. No.: 367,617

[22] Filed: Jun. 19, 1989

[30] Foreign Application Priority Data

Jun. 22, 1988 [FR] France .................... 88 08379

[51] Int. Cl.⁵ .............................. H05B 1/02
[52] U.S. Cl. .................... 219/492; 219/497; 219/494; 219/510; 340/588
[58] Field of Search ............. 219/491, 494, 497, 499, 219/501, 506, 508, 509, 510; 340/588, 589

[56] References Cited

U.S. PATENT DOCUMENTS

| | | | |
|---|---|---|---|
| 4,587,405 | 5/1986 | Andre | 219/497 |
| 4,587,406 | 5/1986 | Andre | 219/497 |
| 4,620,083 | 10/1986 | Andre | 219/491 |
| 4,668,856 | 5/1987 | Axelsor | 219/497 |
| 4,682,298 | 7/1987 | Andre | 219/497 |
| 4,839,503 | 6/1989 | Wolf et al. | 219/497 |
| 4,845,341 | 7/1989 | Rae | 340/589 |

FOREIGN PATENT DOCUMENTS

| | | |
|---|---|---|
| 0074108 | 7/1989 | France . |
| 444417 | 7/1989 | France . |
| 8704815 | 7/1989 | France . |

*Primary Examiner*—M. H. Paschall
*Attorney, Agent, or Firm*—Kenyon & Kenyon

[57] ABSTRACT

For the purpose of effecting the thermal control of a heating apparatus the temperature is allowed to rise to a value lower than a predetermined maximum temperature (TM), whereupon, after stopping the heating, the temperature is allowed to rise through thermal inertia until the aforesaid maximum temperature (TM) is substantially reached, the difference (E) between said maximum temperature and the temperature (TC) at which heating is stopped being determined in dependence on the profile of the temperature rise curve during the heating period.

Utilization in particular in cooking utensils.

22 Claims, 4 Drawing Sheets

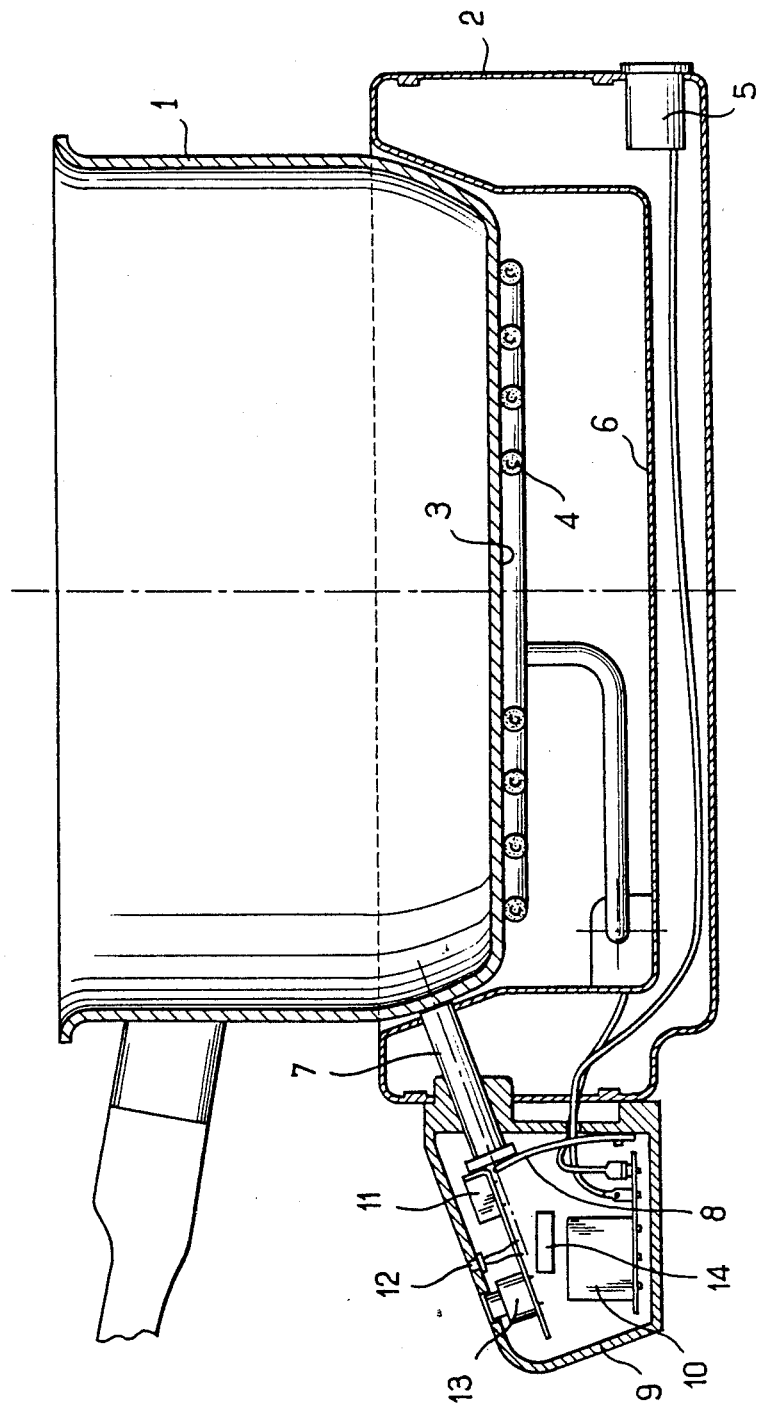

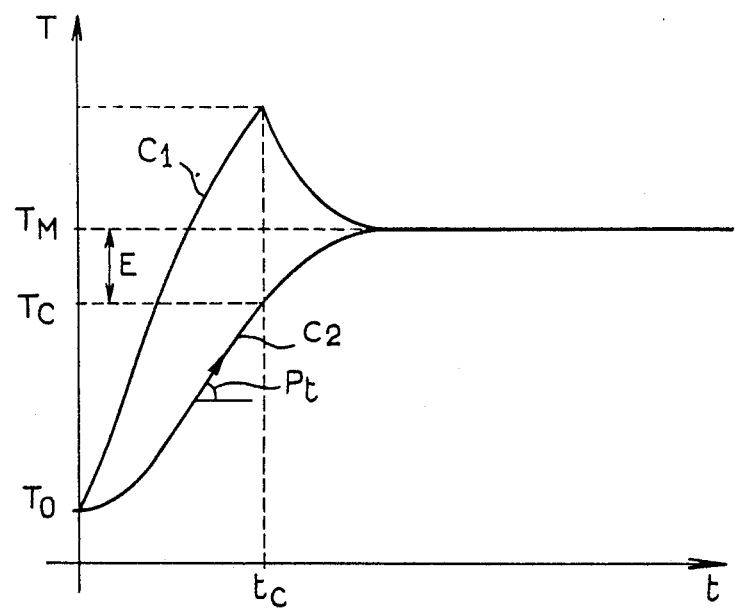
FIG_2
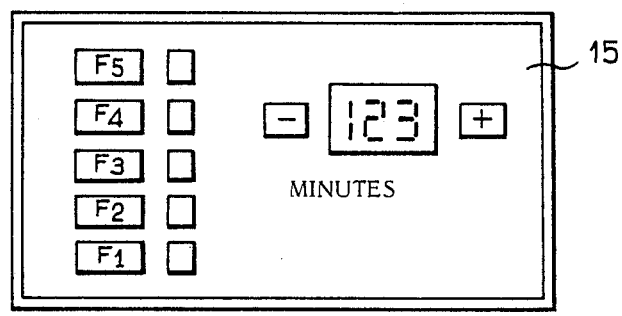
FIG_5

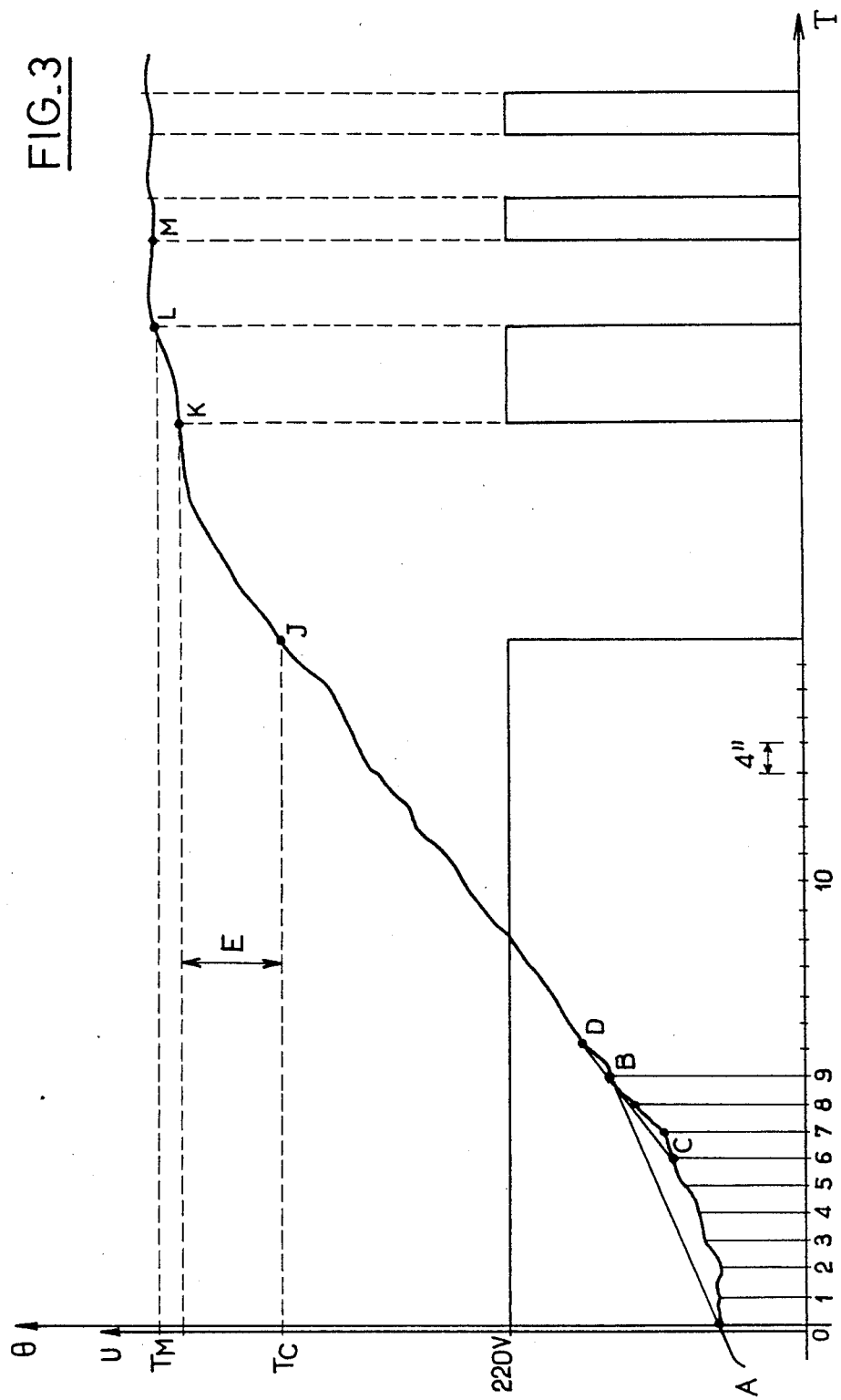

METHOD AND APPARATUS FOR THE THERMAL CONTROL OF A HEATING DEVICE

The present invention relates to a thermal control method for a heating apparatus.

The invention also relates to a device for applying this thermal control method, as well as to the heating apparatus equipped with said device.

The heating apparatus may be a cooking vessel, such as a saucepan, a Dutch oven, a saute pan or the like.

This heating apparatus may also be an industrial heating apparatus or tank.

The various control devices currently used in industry make use of proportional, proportional plus derivative, proportional plus integral plus derivative, and self-adaptive control relating only to a narrow range of temperatures close to the maximum temperature or set temperature. The temperature is thus raised from ambient to maximum temperature and held at that value in accordance with predetermined regimes. Thus, in the case of a cooking vessel such as an electric deep fryer, heating is effected by supplying full power to the heating resistors. The heat load of the vessel, that is to say whether the latter contains a large or a small amount of liquid or is empty, is not taken into account.

No steps have hitherto been taken to adapt the heating conditions to the heat load of the heating apparatus during the raising and maintenance of the temperature.

The present invention seeks to achieve this aim by providing a thermal control method for a heating apparatus which enables the maximum heating temperature to be reached without any risk of exceeding this temperature whatever the heat load of this apparatus, and within a minimum heating time.

According to the invention this thermal control method is defined in that the temperature is allowed to rise to a value markedly lower than a predetermined maximum temperature, whereupon, after stopping the heating, the temperature is allowed to rise through thermal inertia until the aforesaid maximum temperature is substantially reached, the difference between this maximum temperature and the temperature at which heating is stopped being determined in dependence on the profile of the temperature rise curve during the heating period.

By calculating the difference between the temperature at which heating is stopped and the maximum temperature in dependence on the profile of the temperature rise curve, it is thus possible to stop the heating at a given temperature lower than the maximum temperature, whatever the heat load of the apparatus. After the heating has been stopped the rise in temperature continues through thermal inertia until the maximum temperature is reached. In other words, by analyzing the temperature rise curve the method according to the invention makes it possible to predetermine the manner in which the temperature rise curve will evolve through thermal inertia after the heating has been stopped.

In one advantageous version of the invention said difference is determined in dependence on the slope of the temperature rise curve, and the heating is stopped when the measured temperature is slightly below the predetermined maximum temperature less said difference.

The determination of this slope thus makes it possible to foresee the difference, that is to say the manner in which the temperature rise curve will evolve between the temperature at which heating is stopped and the maximum temperature which it is desired to attain.

In a preferred version of the invention, during the rise in temperature the temperature is measured at regular intervals and the mean slope is calculated.

To this end the aforesaid difference is continuously calculated in dependence on the mean slope.

The calculated difference is a function of the slope of the temperature rise curve. This function is determined experimentally.

For the calculation of said difference only the mean slope is preferably taken into account.

In one advantageous version of the method according to the invention, after heating has been stopped the temperature, the slope and the difference are still determined at regular intervals, and the heating is restarted when the measured temperature plus the difference is about 1° C. lower than the predetermined maximum temperature.

There is thus no risk of the maximum temperature being exceeded, whatever the heat load of the apparatus.

Heating is restarted during a period of time calculated in accordance with the following relation:

$$\frac{TM - (TC + E)}{Ptc} \cdot K$$

where
TM is the predetermined maximum temperature,
TC is the temperature at which heating is stopped,
E is the calculated difference,
Ptc is the slope when heating is stopped, and
K is a coefficient between 0.5 and 1, which has been stored in memory after the first stoppage of the heating.

Thus the maximum temperature is maintained very accurately. On termination of the aforesaid heating time the heating is stopped for a fixed period of time, for example some fifteen seconds.

The invention also relates to the device for applying the abovedescribed thermal control method. This device comprises electric heating means, a sensor for measuring temperature, and means for cutting off the supply of electricity.

According to the invention this device comprises a microprocessor programmed to plot at regular intervals the temperature measured by the sensor, in order to calculate the instantaneous and mean slope of the temperature rise curve for the purpose of calculating, in dependence on said slope, the difference between the maximum temperature and the temperature at which heating is stopped, and of controlling the stopping of the heating when the measured temperature is slightly lower than the maximum temperature less said difference.

This microprocessor thus makes all the calculations and all the measurements defined in said method.

The invention also relates to a heating apparatus equipped with said thermal control device.

This heating apparatus preferably, but not limitatively, consists of an electrically heated cooking vessel.

According to a preferred version of the invention this cooking vessel has a plurality of heating functions with different maximum temperatures and means for selecting these functions, while the microprocessor is adapted to operate the thermal control of the heating for each of these functions.

Thus, it is sufficient to select one of these functions and the microprocessor will automatically bring into action the thermal control appropriate to this function, which means that the maximum temperature corresponding to this function will not be exceeded and will be maintained at that value during the desired period of time.

In particular, the cooking vessel may have the following heating functions:

Double saucepan heating with a maximum temperature of about 65° C. and low heating power.

Reheating with a maximum temperature of about 85° C.

Simmering with a maximum temperature of about 95° C.

Boiling with a maximum temperature of about 100° C.

Frying with a maximum temperature of about 170° C.

Other features and advantages of the invention will emerge from the following description.

In the accompanying drawings, given by way of non-limitative examples:

FIG. 1 is a view in section of a cooking vessel provided with a thermal control device according to the invention, FIG. 2 is a diagram showing the evolution of the temperature of the heating resistor and of the vessel, plotted against time, FIG. 3 is a diagram showing the evolution of the temperature of the vessel and also the evolution of the supply voltage of the heating resistor, plotted against time, FIG. 4 is a general flow chart of the operation of the device, FIG. 5 is a schematic diagram of the control panel of the vessel.

In the embodiment shown in FIG. 1 a cooking vessel 1 is intended to contain liquid or solid food which is to be heated and is removably placed on a heating base 2. The bottom 3 of the vessel 1 is in contact with an electric heating resistor 4 supplied with electric current via a connector 5.

The inside wall 6 of the base 2, adjacent to the bottom 3 of the vessel, forms a reflector.

A temperature sensor 7 is disposed on the side of the base 2 and bears against the wall of the vessel 1 under the action of a spring 8. The rear of the sensor 7 is housed in a casing 9 containing various electronic components, in particular a power relay 10, a microswitch 11 detecting the presence of the vessel 1, operating indicator lights 12, and buttons 13.

The casing 9 also contains a microprocessor 14 of the 4-bit type, for example COP 422, programmed to bring into action the various functions which will be described later on.

FIG. 2 shows the evolution of the temperature T, plotted against time t, of the heating element 4 (curve C1) and of the wall of the vessel 1 (curve C2). Taking into account the thermal inertias, the temperature of the heating element 4 rises more quickly than that of the vessel 1.

At the moment Tc when the electric current supplying the heating element 4 is cut off the temperature of the latter falls rapidly, while that of the vessel 1 continues to increase from the cutoff temperature Tc. The temperature of the heating element 4 and the temperature of the vessel 1 tend toward an equal value TM.

If TM is the maximum or set temperature which it is desired to attain in the vessel 1, it can be seen that the heating of the heating element 4 must be stopped when the temperature of the vessel 1 reaches the value Tc. The difference E between the temperatures TM and Tc must therefore be predetermined.

Tests and calculations have shown that the difference E is the greater, the quicker the temperature rise of the vessel 1. The value of the difference E is a function of the slope Pt of the curve C2 of the temperature rise of the vessel 1.

At the heating cutoff temperature Tc the thermal equilibrium equation can in fact be written as follows:

IR ($\Delta$T - E) = Ic . E where IR = inertia of resistor
Ic = inertia of vessel.

That is to say:

$$E = \Delta T \cdot \frac{IR}{IR + IC}$$

The heat transfer condition is written as follows:
P = K . S . $\Delta$T
where P is the heating power,
S is the heat exchange area, and
K is a constant.
The heat balance equation is written as follows:
P = Pt . (IR + IC)
and hence $$E = \frac{IR}{K \cdot S} \cdot Pt$$

Since IR, K and S are constants, the difference E is definitely proportional to the slope of the curve C2 of the temperature rise of the vessel 1. This linear law is valid as a first approximation. However, in order to calculate E more accurately, it is preferable to apply a parabolic law.

According to the invention the microprocessor 14 calculates, as a function of time and of the temperature measured by the sensor 7, the slope Pt of the curve C2, and on the basis of this slope determines the value of the difference E.

The microprocessor 14 controls the stopping of the heating, that is to say the cutting off of the electricity supply of the resistor 4 when the temperature measured by the sensor 7 is slightly lower than the maximum temperature TM predetermined, less the difference E. According to the invention it is in fact preferable to cut off the heating at a temperature slightly lower than that theoretically necessary, to avoid all risk of exceeding the temperature TM.

After stabilization of the temperature measured by the sensor 7, the device according to the invention preferably measures the temperature of the vessel regularly every four seconds (see FIG. 3).

The temperature measured by the sensor 7 is corrected in accordance with a relation of the type A + B Pt in which Pt is the mean slope calculated at the moment of measurement, A is a correction coefficient taking into account the thermal braking of the sensor/wall of the vessel 1, and B is a correction coefficient taking into account the inertia of the system.

During the beginning of the heating the temperature rise curve is incurvate and often irregular. In order to compensate for this circumstance, the slope Pt and the difference E are calculated for the moments 0 - 1 and then 2 - 0, followed by 3 - 0 and so on up to 9 - 0. The mean is then represented by the straight line AB (see FIG. 3). In order not to be influenced by the first measurements, the following mean is calculated for the moments 10 - 6, that is to say the straight line CD, and then for the moments 11 - 6; 12 - 6; 13 - 6 and so on.

Each measurement of temperature is followed by calculation of the slope Pt and calculation of the difference E in accordance with the formula $$K1Pt + K2Pt^2.$$

In this formula, for the type of heating vessel previously described, K1 and K2 are the coefficients of the parabolic function. In order to be certain that the set temperature TM will not be exceeded, the calculation of the difference E is slightly increased. The comparison is made in the following manner: as soon as the current corrected sensor temperature TC +E is higher than the set temperature TM, the supply to the heating element 4 is cut off. At the moment when the heating is interrupted (point J in the diagram) the slope PtC at the cutoff is stored in memory. Taking into account the precautions taken (correction of the sensor reading and increase of the slope), the set temperature TM will probably not be reached. One or more resumptions of heating will be necessary. These resumptions of heating will be effected with the parameters stored in memory at the moment of the first cutoff. It will now be explained how the temperature is maintained after the first interruption of the electricity supply.

The measurements of temperature continue to be made every 4 seconds, and the slope and the difference E continue to be calculated. In this maintenance phase the slope is calculated with the last 10 temperatures in accordance with the relation $\theta(TC) - \theta(TC - 10)/9 \times 4$. The difference E in turn is still calculated in the same way (see above). When the current corrected sensor temperature TC + the difference E is 1° C. lower than the set temperature TM, a certain amount of current is supplied to the heating element 4.

The duration of the heating (between the points K and L in FIG. 3) is calculated in accordance with the relation:

$$\frac{TM - (TC + E)}{Ptc} \cdot K$$

where TM is the predetermined maximum set temperature,

TC is the heating cutoff temperature,

E is the difference calculated,

Ptc is the slope when the heating is interrupted,

K is a coefficient between 0.5 and 1 and generally equal to 0.8.

After expiry of the aforesaid heating period, the heating is cut off for a fixed time equal to 15 seconds (delay time between the points L and M in FIG. 3).

This phase in which the temperature is maintained close to the value TM is illustrated by the flow chart in FIG. 4.

The heating cooking vessel shown in FIG. 1 has various heating functions F1, F2, F3, F4, F5 having different maximum temperatures, and has means for selecting these functions, while the microprocessor (14) is adapted to operate the thermal control of the heating for each of these functions.

In the example illustrated this heating vessel has the following functions:

Double saucepan heating with a maximum temperature of about 65° C. and low power.

Reheating with a maximum temperature of about 85° C.

Simmering with a maximum temperature of about 95° C.

Boiling with a maximum temperature of about 100° C.

Frying with a maximum temperature of about 170° C.

For this purpose the control panel 15 (see FIG. 5) of the heating vessel has five buttons F1, F2, F3, F4, F5 intended to be operated by the user and enabling the various abovementioned heating functions to be selected.

The control panel 15 also has two buttons (— and +) for programming the operating times for the different heating functions.

A detailed description will now be given of each of these heating functions.

BOILING FUNCTION.

In order to bring a liquid to boiling temperature it is necessary to supply the calories necessary for raising its temperature (specific heat), to compensate for thermal losses of the heating means (radiation and conduction of the heating element), and to compensate for thermal losses of the vessel. Practice shows that the total of the thermal losses is substantially constant whatever the amount of liquid contained in the vessel.

In order to keep a liquid at boiling point it is sufficient to compensate for the thermal losses of the system and to supply the calories necessary for minimum evaporation. If there is an excess of calories, the boiling will become violent and evaporation will become considerable.

For the boiling function (whatever the nature of the liquid: water, soup, milk or the cooking of pasta, rice or the like, and the amount of liquid), the virtual set temperature TM is 97° C. The difference E will be calculated so that this temperature is attained. However, as soon as the temperature TC =90° C. is reached, the heating element 4 is supplied at 10% of its rated power (3 seconds under voltage with a time base of 30 seconds).

Two cases may then arise:

(a) A lid is placed on the vessel: the temperature curve incurves slightly. The temperature curve becomes substantially tangent to the virtual temperature of 97° C. and autostabilizes at a temperature of about 100° C. depending on the type of liquid (water, salted water, milk, and so on). The feeding of the evaporation plateau of the liquid continues at 10% of the rated power (3 seconds under voltage with a time base of 30 seconds).

(b) If there is no lid: the temperature curve incurves to a marked extent and falls, because losses are heavy; the temperature whose difference would enable 97° C. to be attained is not reached. The slope becomes negative and feeding is resumed at a value of 50% of the rated power, thus enabling the liquid to reach its boiling plateau.

GENTLE HEAT (OR DOUBLE SAUCEPAN) FUNCTION.

The energy required for the double saucepan heating function is:

slow rise in temperature, regulation at 65° C. (maximum set temperature TM).

To do this, the power supplied to the resistor 4 is one sixth of its rated power (5 seconds under voltage with a time base of 30 seconds).

If the vessel contains a certain amount of liquid, the temperature after heating for one minute will have reached a value of 5° C. (so-called critical value). If this critical temperature is exceeded, this proves that the heat transmission "resistor 4 +bottom of vessel +product to be heated +wall of vessel +sensor" is correctly achieved; there is probably a small quantity of liquid (for example a sauce). Operation at one sixth of the rated power is continued.

If the temperature is not reached, there is probably a large amount of liquid (a soup to be gently heated for example). Heating then changes over to rated power.

In both cases the set temperature TM is 65° C.

SAFETY FOR THE FRYING FUNCTION.

The frying of food assumes that the food to be cooked is not very watery and that the vessel can reach the temperature of 170° C. (cooking meat, fish and the like, preparing caramel, and so on).

It may, however, occur that the frying function is programmed by mistake for a liquid having a boiling point close to 100° C.

After heating for one minute, in the case of dry cooking (grilled or saute meat, caramel, and so on) the temperature should have exceeded a critical temperature of 20° C. If this is not the case, the heating then changes automatically to the "simmering" function (maximum temperature 95° C).

SAFETY FOR EVAPORATION (DISAPPEARANCE OF LOAD).

When the "boiling" function is used, the complete evaporation of the boiling liquid brings about a rise in the temperature of the vessel.

When the temperature exceeds 110° C., the supply to the heating element 4 is interrupted.

STABILIZATION OF THE TEMPERATURE SENSOR.

A hot vessel may be placed on the heating resistor 4; on the other hand, the sensor 7, heated by the radiation from the resistor, may be applied against a cold vessel. In all cases of utilization the temperatures of the sensor and of the vessel are not identical.

The first phase of thermal control consists in calculating the successive slopes and applying voltage to the resistor only if the instantaneous slope, averaged in accordance with the process previously described, is lower than a certain value, such as 0.1 for example.

The different heating functions of the heating vessel according to the invention are thus entirely controlled by the microprocessor. The user has only to select one of the functions and the operating time.

In all cases the maximum temperature cannot be exceeded whatever the amount of product to be heated inside the vessel.

In addition to the foregoing, the method described above can also be adapted for diagnosing whether the set temperature has been reached.

For this purpose it is necessary to determine the moment when the set temperature programmed, by means of the key for the function selected, is reached. It is starting from this moment that the programmed temperature maintenance time will be counted.

Two cases arise:

(A). "Boiling" function.

In this case, starting from about 90° C., the supply to the heating resistor is cycled to obtain a mean power of about 50 or 10% of the rated power.

Taking into account the dispersion in the temperature measurement, knowledge of this measurement alone does not make it possible to ascertain accurately the moment when boiling starts.

Use is made of the physical definition of a boiling plateau, which is the existence of a perfectly stabilized temperature.

The following double test is thus carried out:
minimum temperature reached (97° C. for example),
slope practically zero (<0.05° C./s for example).

When these two conditions are met, the set temperature is considered to have been reached, and this moment is stored in memory for time control.

(B). Other functions.

In this case the set temperature is considered to have been reached when the temperature TC is less than a few degrees from the set value (within 5° C. for example).

Example:

Function F2 programmed (85° C.).

at 80° C. the set value will be considered to have been reached, and this moment will be stored in memory.

The programming of the cooking cycles is effected as indicated below depending on whether or not the function programmed provided for heat retention.

(A) With heat retention.

The moment when the set temperature was reached having been ascertained, the temperature programmed by the function selected is maintained during a "plateau time".

If a time has been programmed with the aid of a timer, the duration of this plateau is equal to this time.

Otherwise, a default time is applied. This time, preprogrammed by the function selected, depends on the latter, for example:

| Function selected: | F1 | F2 | F3 | F4 | F5 |
|---|---|---|---|---|---|
| Default time in minutes: | 60 | 61 | 60 | 30 | 15 |

When the duration of this maintenance plateau is at an end, the cycle passes to the heat retention mode (which corresponds to the function F1) for a predetermined time, for example 90 minutes.

On termination of this heat retention time the cooking cycle is complete.

(B) Without heat retention.

The process is identical to the previous case, but the end of the cooking cycle occurs as soon as the maintenance plateau is finished.

The invention is obviously not restricted to the illustrative embodiment described above, and numerous modifications can be made to it without departing from the scope of the invention.

Thus, the method according to the invention may be applied to the thermal control of any apparatus, such as a chemical reactor, radiator, convector, hotplate or the like.

We claim:

1. A method for controlling the operation of an apparatus for heating a substance to a predetermined maximum temperature TM, the method comprising:
   (a) activating the apparatus to heat the substance;
   (b) measuring a temperature of the substance being heated by the apparatus;
   (c) determining a profile of the temperature of the substance during step (a) as a function of time;
   (d) calculating a temperature difference E that depends on the temperature profile determined in step (c); and
   (e) deactivating the apparatus when the measured temperature of the substance reaches a value TC near the value of TM minus E.

2. The method of claim 1 wherein step (d) comprises calculating the temperature difference E as a function of the slope of the temperature profile, and step (e) comprises deactivating the apparatus at a value of TC slightly below the value of TM minus E.

3. The method of claim 2 wherein step (b) comprises measuring the temperature of the substance at regular intervals, and step (d) comprises calculating the mean slope of the temperature profile.

4. The method of claim 5 wherein step (d) comprises continuously calculating the temperature difference E as a function of the mean slope of the temperature profile.

5. The method of claim 2 wherein the function is determined experimentally.

6. The method of claim 5 wherein step (d) comprises calculating the temperature difference as a function of only the mean slope of the temperature profile.

7. The method of claim 3 or 4 or 5 comprising the further steps after step (e) of:
   (f) measuring the temperature of the substance at regular intervals;
   (g) determining the temperature profile as a function of time;
   (h) calculating the mean slope of the temperature profile at regular intervals;
   (i) calculating the temperature difference E at regular intervals as a function of the mean slope calculated in step (h); and
   (j) reactivating the heating apparatus for a predetermined period of time when the value of the measured temperature plus the temperature difference E calculated in step (i) is about 1° C. lower than the predetermined maximum temperature TM.

8. The method of claim 7 wherein the predetermined period of time of step (j) is calculated according to the relation:

$$\frac{TM - (TC + E)}{Ptc} = K,$$

where
TM is the predetermined maximum temperature,
TC is the measured temperature of the substance at which the heating apparatus was deactivated,
E is the calculated temperature difference,
Ptc is the slope of the temperature profile when the heating apparatus is deactivated, and
K is a coefficient having a predetermined value between 0.5 and 1.

9. The method of claim 8 further comprising, after the calculated period of time of step (j), deactivating the heating apparatus for a fixed period of time.

10. In an apparatus including an electric heating means for heating a substance and means for activating and deactivating the electric heating means, a device for controlling the heating apparatus so as to heat the substance to a predetermined maximum temperature TM, the device comprising:
   a sensor for measuring a temperature of the substance to be heated by the electric heating means;
   a microprocessor programmed to plot a profile at regular intervals after activation of the electric heating means of the temperature measured by the sensor, to calculate the instantaneous and mean slopes of the temperature profile, to calculate as a function of one of said slopes a temperature difference E between the maximum temperature TM and a predicted value of the temperature measured by the sensor at which to deactivate the electric heating means such that temperature inertia of the apparatus will allow the temperature of the substance to rise to TM, and to operate the means for deactivating the electric heating means when the measured temperature of the substance reaches a value TC which is slightly lower than the value of TM minus E.

11. An apparatus for heating a substance to a predetermined maximum temperature TM, the apparatus comprising:
   electric heating means;
   means for activating and deactivating the electric heating means;
   a sensor for measuring a temperature corresponding to a temperature of the substance to be heated by the electric heating means;
   a microprocessor programmed to plot a profile, at regular intervals after activation of the electric heating means, of the temperature measured by the sensor, to calculate the instantaneous and mean slopes of the temperature profile, to calculate as a function of one of said slopes a temperature difference E between the maximum temperature TM and a predicted value of the temperature measured by the sensor at which to deactivate the electric heating means such that temperature inertia of the apparatus will allow the temperature of the substance to rise to TM, and to operate the means for deactivating the electric heating means when the measured temperature of the substance reaches a value TC which is slightly lower than the value of TM minus E.

12. An electrically heated cooking vessel for heating a substance to at least one predetermined maximum temperature TM, the cooking vessel comprising:
   a container for the substance;
   electric heating means;
   means for activating and deactivating the electric heating means;
   a sensor for measuring a temperature of the container corresponding to a temperature of the substance to be heated by the electric heating means;
   a microprocessor programmed to plot a profile, at regular intervals after activation of the electric heating means of the temperature measured by the sensor, to calculate the instantaneous and mean slopes of the temperature profile, to calculate as a function of one of said slopes a temperature difference E between the maximum temperature TM and a predicted value of the temperature measured by the sensor at which to deactivate the electric heating means such that temperature inertia of the apparatus will allow the temperature of the substance to rise to TM, and to operate the means for deactivating the electric heating means when the measured temperature of the substance reaches a value TC which is slightly lower than the value of TM minus E.

13. The cooking vessel of claim 12, further comprising means for selecting a plurality of cooking functions, each function having a different corresponding predetermined maximum temperature TM, and wherein the microprocessor is programmed to operate the means for activating and deactivating the electric heating means in accordance with each cooking function.

14. The cooking vessel of claim 13 wherein the plurality of cooking functions include:
   double saucepan heating, with a maximum heating temperature Tm of about 65° C. and low heating power;
   reheating, with a maximum temperature TM of about 85° C.;
   simmering, with a maximum temperature TM of about 95° C.;
   boiling, with a maximum temperature TM of about 100° C.; and
   frying, with a maximum temperature TM of about 170° C.

15. The cooking vessel of claim 13 or 14, further comprising means for programming an operating time of the cooking vessel.

16. The cooking vessel of claim 15 wherein the selecting means and the means for programming an operating time comprise keys intended to be operated by a user of the cooking vessel.

17. The cooking vessel of claim 14, further comprising means for reducing heating power when a measured temperature of the order of 90° C. is reached while the cooking vessel is operating in the boiling function.

18. The cooking vessel of claim 17, further comprising means for increasing heating power when the container is without a lid.

19. The cooking vessel of claim 14, further comprising means for lowering heating power to a reduced value is said maximum temperature TM is reached within a predetermined period of time and for raising the heating power to a higher value if said maximum temperature is not reached within the predetermined period of time, when the cooking vessel is operating in the double saucepan heating function.

20. The cooking vessel of claim 14, further comprising means for automatically selecting the simmering function when the predetermined maximum temperature TM is not reached within a predetermined period of time while the cooking vessel is operating in the frying function.

21. The cooking vessel of claim 14, further comprising means for automatically deactivating the electric heating means if the measured temperature exceeds 110° C. while the cooking vessel is operating in the boiling function.

22. The cooking vessel of claim 12 or 13 or 14, further comprising means for initiating the means for activating the electric heating means only when the calculated mean slope of the temperature profile is less than about 0.1° C./second.

* * * * *